US012670291B2

(12) United States Patent
Kwok et al.

(10) Patent No.: US 12,670,291 B2
(45) Date of Patent: Jun. 30, 2026

(54) PREDICTING LIKELIHOOD OF AND PREVENTING END USERS INAPPROPRIATELY INPUTTING SENSITIVE DATA

(71) Applicant: Capital One Services, LLC, McLean, VA (US)

(72) Inventors: Jennifer Kwok, Brooklyn, NY (US); Salik Shah, Washington, DC (US); Mia Rodriguez, Broomfield, CO (US)

(73) Assignee: Capital One Services, LLC, McLean, VA (US)

( * ) Notice: Subject to any disclaimer, the term of this patent is extended or adjusted under 35 U.S.C. 154(b) by 336 days.

(21) Appl. No.: 17/895,618

(22) Filed: Aug. 25, 2022

(65) Prior Publication Data

US 2024/0070312 A1 Feb. 29, 2024

(51) Int. Cl.
| | |
|---|---|
| *G06F 21/62* | (2013.01) |
| *G06F 40/174* | (2020.01) |
| *G06F 40/279* | (2020.01) |
| *G06F 40/40* | (2020.01) |
| *H04L 51/02* | (2022.01) |

(52) U.S. Cl.
CPC ........ *G06F 21/6245* (2013.01); *G06F 40/174* (2020.01); *G06F 40/279* (2020.01); *G06F 40/40* (2020.01); *H04L 51/02* (2013.01)

(58) Field of Classification Search
CPC ....... H04L 51/02; G06F 40/40; G06F 40/279; G06F 40/174; G06F 21/6245
See application file for complete search history.

(56) References Cited

U.S. PATENT DOCUMENTS

| | | | |
|---|---|---|---|
| 8,392,992 B1 | 3/2013 | Spertus | |
| 8,799,287 B1 | 8/2014 | Barile et al. | |
| 9,177,174 B1 * | 11/2015 | Shoemaker ......... | G06F 21/6254 |
| 10,645,225 B1 | 5/2020 | Stoops et al. | |
| 11,062,098 B1 | 7/2021 | Bergeron et al. | |
| 11,089,157 B1 | 8/2021 | Lumsden et al. | |
| 11,093,632 B1 | 8/2021 | Ton-That | |
| 2003/0005329 A1 | 1/2003 | Ikonen | |
| 2004/0128552 A1 | 7/2004 | Toomey | |
| 2006/0195328 A1 | 8/2006 | Abraham et al. | |
| 2006/0265640 A1 | 11/2006 | Albornoz et al. | |
| 2012/0027195 A1 | 2/2012 | Shaffer et al. | |

(Continued)

*Primary Examiner* — Thomas J Dailey

(74) *Attorney, Agent, or Firm* — Bookoff McAndrews, PLLC

(57) ABSTRACT

Disclosed aspects pertain to predicting a likelihood that a user enters sensitive data inappropriately and mitigating such a risk. An electronic form is monitored for user interaction. Non-biometric behavior data can be received or otherwise acquired for the user. A machine learning model can be invoked to determine a likelihood that the user will input sensitive data inappropriately into a form field based on the similarity of user non-biometric behavior data with historic non-biometric behavior data. User assistance, such as a message or warning, can be initiated when the likelihood satisfies a predetermined threshold to mitigate the risk of input of sensitive data inappropriately. The field can also be monitored to detect the presence of inappropriate sensitive data. The user can be prompted to redact or remove the sensitive data if detected.

20 Claims, 10 Drawing Sheets

(56)                  References Cited

U.S. PATENT DOCUMENTS

| | | | |
|---|---|---|---|
| 2014/0052999 A1 | 2/2014 | Aissi et al. | |
| 2015/0281446 A1 | 10/2015 | Milstein et al. | |
| 2016/0092581 A1 | 3/2016 | Joshi et al. | |
| 2017/0249478 A1 | 8/2017 | Lovin | |
| 2017/0270310 A1 | 9/2017 | Becker et al. | |
| 2019/0026494 A1 | 1/2019 | Smith et al. | |
| 2019/0164539 A1 | 5/2019 | Schmidt et al. | |
| 2019/0171846 A1 | 6/2019 | Conikee et al. | |
| 2019/0340518 A1 | 11/2019 | Merrill et al. | |
| 2019/0379797 A1 | 12/2019 | Sahagun | |
| 2020/0137110 A1* | 4/2020 | Tyler | H04L 63/1483 |
| 2020/0233550 A1 | 7/2020 | Kalathur et al. | |
| 2020/0257576 A1 | 8/2020 | Gallagher et al. | |
| 2021/0124831 A1 | 4/2021 | Meyer et al. | |
| 2021/0125615 A1 | 4/2021 | Medalion et al. | |
| 2021/0240836 A1* | 8/2021 | Hazony | G06F 21/577 |
| 2021/0334407 A1 | 10/2021 | North et al. | |
| 2022/0357929 A1* | 11/2022 | Vijayaraghavan | G06N 3/04 |

* cited by examiner

NON-BIOMETRIC BEHAVIOR DATA

451

USER DATA　　AGENT DATA　　DIGITAL INTERACTION DATA 452　　　454　　　456

BIOMETRIC BEHAVIOR DATA

450

426

MACHINE LEARNING MODEL 458　　　460　　　462

SENSITIVE INFORMATION INCORRECTLY ENTERED

SENSITIVE INFORMATION

RISK SCORE (OR THRESHOLD LEVEL)

PREDICTING LIKELIHOOD OF AND PREVENTING END USERS INAPPROPRIATELY INPUTTING SENSITIVE DATA

BACKGROUND

Customer service representatives/agents and customers (e.g., users) may accidentally enter sensitive information such as personally identifiable information (PII) into wrong form fields or locations in electronic documents. For example, customers and agents have been found prone to enter social security numbers (SSNs) and credit card numbers into incorrect portions including the note fields of electronic documents. Customers have also accidentally filled in their user names with their SSNs or credit card numbers. Customers also incorrectly enter sensitive information such as PII in a number of other unconventional ways. When entered incorrectly, this unmasked sensitive information may end up being transmitted without proper encryption and may not be properly encrypted and stored. This may violate federal and international regulations requiring sensitive information and PII to be properly transmitted and stored with adequate safety measures. When an organization violates one or more regulations, that organization may suffer from a damaged reputation. If the public knows an organization violates regulations regarding proper handling of sensitive information and PII, that organization may suffer from public trust and eventually lose economically from the loss of business from a reduced customer base.

SUMMARY

The following presents a simplified summary to provide a basic understanding of some aspects of the disclosed subject matter. This summary is not an extensive overview. It is not intended to identify necessary elements or delineate the scope of the claimed subject matter. Rather, this summary presents some concepts in a simplified form as a prelude to the more detailed description presented later.

According to one aspect, disclosed embodiments can include a system that comprises a processor coupled to a memory that includes instructions associated with user assistance that, when executed by the processor, cause the processor to detect interaction with an electronic form by a user, determine non-biometric behavioral data of the user, and invoke a machine learning model with the non-biometric behavioral data of the user. The machine learning model is trained to predict a likelihood that a user will enter sensitive data in an electronic form field inappropriately, such that the sensitive data will be unmasked, by comparing similarity of user non-biometric behavioral data to other user non-behavioral data associated with past interaction with the electronic form. Further, the instructions can cause the processor to initiate user assistance that mitigates risk of inappropriate entry of sensitive data in the electronic form field when the likelihood satisfies a predetermined threshold. In one situation, the user assistance may correspond to a message that provides information regarding sensitive data input. In another situation, the user assistance can correspond to a chatbot that informs the user how to enter sensitive data correctly. The instructions can further cause the processor to detect an electronic form field with inappropriate sensitive data and request the user remove the sensitive data from the electronic form field. Further, the instructions can cause the processor to prevent further input into another electronic form field until the sensitive data is removed, such as preventing the user from moving to a next screen until the sensitive data is removed. The instructions can also cause the processor to perform natural language processing to identify sensitive data entered incorrectly. Further, the instructions can cause the processor to activate a light or audible indicator when the sensitive data is entered incorrectly. In one instance, the non-biometric behavior data includes at least one of customer data, customer service agent data, or digital interaction data. The digital interaction data can comprise digital engagement analytics, including at least one of time of engagement, frequency of engagement, or frequency of data violations.

In accordance with another aspect, disclosed embodiments can include a method comprising executing, on a processor, instructions that cause the processor to perform operations. The operations include detecting interaction with an electronic form by a user, determining non-biometric behavioral data of the user comprising profile and digital interaction data, and invoking a machine learning model with the non-biometric behavioral data of the user. The machine learning model can be trained to predict a likelihood that a user will enter sensitive data in an electronic form field inappropriately, such that the sensitive data will be unmasked, by comparing similarity of user non-biometric behavioral data to other user non-biometric behavioral data associated with past interaction with the electronic form. Further, the operations can include triggering user assistance that mitigates risk of inappropriate entry of sensitive data in the electronic form field when the likelihood satisfies a predetermined threshold. The operations can also comprise triggering display of a tooltip associated with the electronic form field as the user assistance to indicate a likelihood that the sensitive data will be inappropriately included in the field. Further, the operations can comprise invoking a chatbot to inform the user on how to enter sensitive data correctly. The operations can further comprise displaying a message that provides information regarding sensitive data input as the user assistance. Further, the operations can comprise determining customer service agent data as part of the non-biometric behavior data. The operations can also comprise detecting an electronic form field with inappropriate sensitive data and requesting the user remove the sensitive data from the electronic form field. Furthermore, the operations can comprise preventing the user from advancing to a next screen until the sensitive data is removed.

According to yet another aspect, disclosed embodiments can include a computer-implemented method. The method comprises detecting interaction with an electronic form by a user, receiving non-biometric behavioral data of the user comprising user profile data and digital engagement data, and executing a machine learning model with the non-biometric behavioral data of the user as input. The machine learning model can be trained to predict a likelihood that a user will enter sensitive data in an electronic form field inappropriately, such that the sensitive data is unmasked, by comparing the similarity of non-biometric behavior data to other user non-biometric behavior data associated with pasted interaction with the electronic form. Further, the method can comprise initiating user assistance that mitigates risk of inappropriate entry of sensitive data in the electronic form field when the likelihood satisfies a predetermined threshold. The method can also comprise triggering display of a tooltip associated with the electronic form field as the user assistance that indicates a likelihood that the sensitive data will be inappropriately included in the field. Furthermore, the method comprises detecting sensitive data in the electronic form field, requesting the user redact the sensitive data, and preventing input in other electronic form fields until the sensitive data is redacted.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

The accompanying drawings, which are incorporated in and constitute a part of the specification, illustrate various example methods and configurations of a variety of aspects of the claimed subject matter. It will be appreciated that the illustrated element boundaries (e.g., boxes, groups of boxes, or other shapes) in the figures represent one example of the boundaries. It is appreciated that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
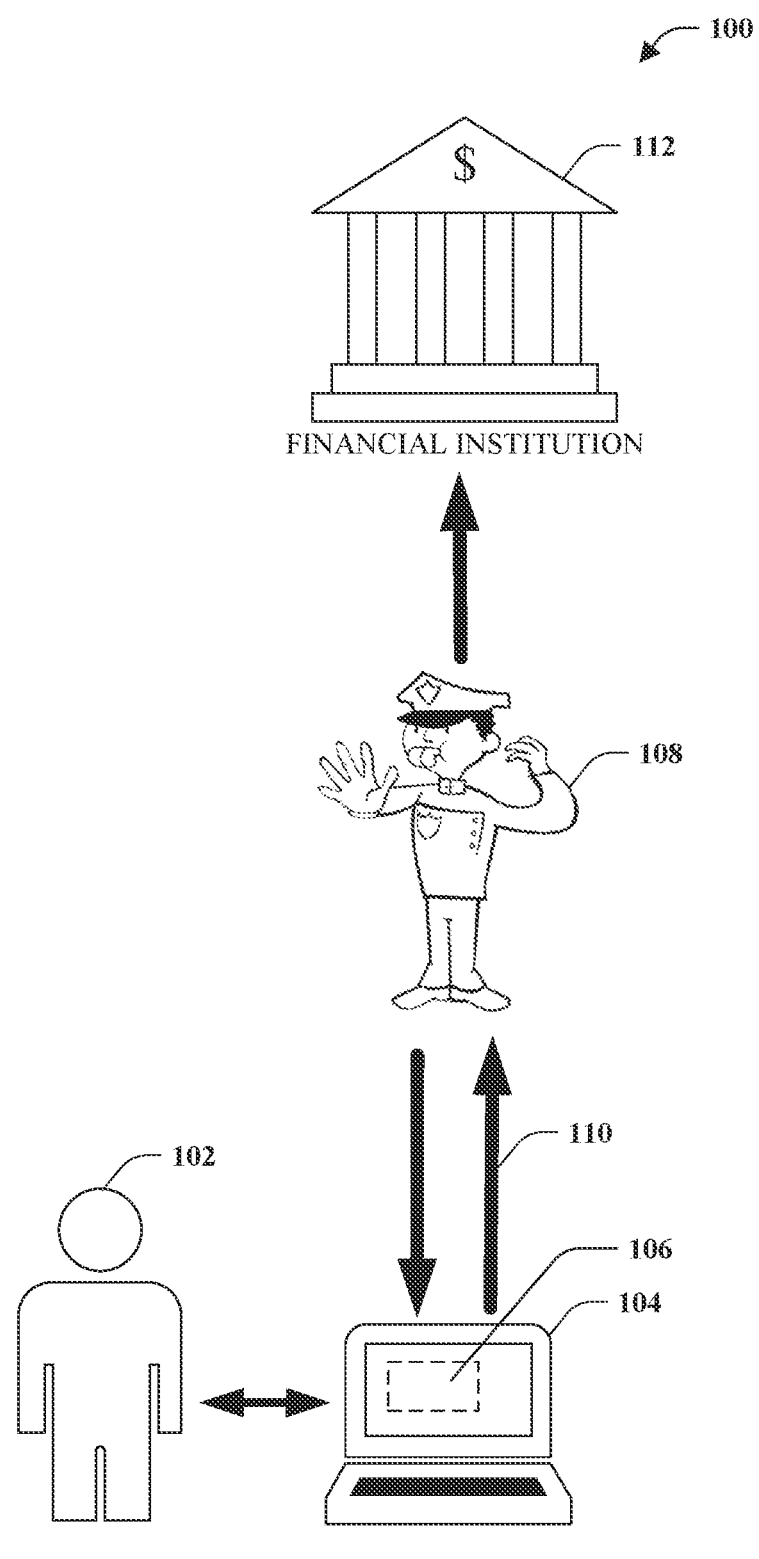
FIG. 1 illustrates an overview of an example implementation.

The claims and this disclosure relate to non-biometric behavioral data. Non-behavioral data can be defined as data related to a person's profile. For example, the characteristics, non-biometric behavioral data, of the user entering sensitive data into a computer system can be known and monitored. This non-behavior data creates a unique non-behavioral profile of each end user. This non-behavioral data may be used to predict which users with a specific non-behavioral data are more or less likely to input sensitive information inappropriately.

"Non-biological behavior" as used herein means not "biologic behavior". Non-biometric behavioral data includes age, age range, gender, location, time of day, response, and time. Other non-biometric behavioral data can include lack of knowledge, inaccessibility to direct contact with a customer service representative, residential location, fingerprint, voice, iris pattern, and so on. Other non-behavioral data may include current job or other title and position within an organization hierarchy (e.g., CEO, CTO, CFO, VP, Group Manager, Tech Support Staff, Other Staff); current tasks/projects assigned to the User (e.g., High Level Management, Personnel Management, Management of Finances, Product Management, Customer Support, Bug Diagnose and Fix, etc.); normal work hours; normal work locations; average rate of use of enterprise collaborative communication tools; and so on.

The concept of using non-biometric behavioral data (e.g., user profile) to predict the likelihood of and prevent inappropriately/incorrectly inputting sensitive information into standard documents can prevent the nonintentional release of personally identifiable information (PII). Non-biometric behavioral data can be used to analyze a user's digital-physical characteristic/user profile and is commonly used as a fraud prevention solution. Some of the same concepts of non-biometric behavior may be used to prevent the unauthorized release of PII or other sensitive information by customers, customer agents, or other personnel when entering data into a system such as a business system, banking system, or another system as understood by those of ordinary skill in the art.

Details disclosed herein generally pertain to a way of preventing sensitive information from being incorrectly/inappropriately entered and stored into a computer system. A method includes detecting a non-biometric behavioral data of a user. The non-biometric behavioral data may be determined at an electronic device or in software while entering data into a form associated with the software. A determination is made if the non-biometric behavioral data is associated with entering sensitive information is entered incorrectly. When the non-biometric behavioral data is associated with entering sensitive information, a determination is made if the sensitive information is entered or being entered incorrectly. If the sensitive information is entered incorrectly, the method prompts the user for the sensitive information to be entered correctly.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

"Non-biological behavior" as used herein means not "(biologic behavior)". "Non-biological behavior" includes age, age ranges, gender, location, time of day, response, time, "lack of knowledge", inaccessibility to direct contact with a customer service representative, residential location, fingerprint, voice, iris pattern, and so on.

"Processor" and "Logic", as used herein, include but are not limited to hardware, firmware, software, and/or combinations of each to perform a function(s) or an action(s), and/or to cause a function or action from another logic, method, and/or system to be performed. For example, based on a desired application or need, the logic and/or the processor may include a software-controlled microprocessor, discrete logic, an application specific integrated circuit (ASIC), a programmed logic device, a memory device containing instructions, or the like. The logic and/or the processor may include one or more physical gates, combinations of gates, or other circuit components. The logic and/or the processor may also be fully embodied as software. Where multiple logics and/or processors are described, it may be possible to incorporate the multiple logics and/or processors into one physical logic (or processor). Similarly, where a single logic and/or processor is described, it may be possible to distribute that single logic and/or processor between multiple physical logics and/or processors.

Referring initially to FIG. 1, a high-level overview of an example implementation of a system 100 for preventing sensitive information from inappropriately or incorrectly entering an electronic file is illustrated. Preferably the sensitive information is prevented from inappropriately or incorrectly being saved into the file at the time of file creation or updating. It is much easier to preemptively prevent the inappropriate/incorrect use of sensitive information rather than trying to correct the inappropriate/incorrect user later. This example implementation includes a user 102 entering information into a computer 104. The user 102 may be entering sensitive information related to an online purchase, another business transaction, a banking transaction, and the like. The computer 104 may be a laptop, tablet computer, mobile phone, or another electronic device. The user 102 may be entering sensitive information 106, such as personally identifiable information (PII), into a form on the computer 104. The sensitive information 106 may be entered through a webpage, special form, and the like that may be provided by a financial institution 112, business, school, church, or other organization. As sensitive information 106 is being entered, or when it is transmitted to the financial institution 112, a gateway 108 (represented by the police person) checks to make sure the sensitive information 106 is entered in the correct location so that it will be properly obfuscated or otherwise properly handled as sensitive information. In one example, the gateway 108 may detect non-biometric behavioral data of the user and use this information to determine, at least in part, if sensitive information is being entered incorrectly. As discussed below, in some instances, the gateway 108 may be in the form of a machine learning model. If the sensitive information 106 is improperly entered, the gateway 108, via return path 110 to the computer 104, will instruct or prompt the user 102 on how to properly re-enter the sensitive information 106. In another configuration, the gateway 108 may be located in the financial institution 112, or, alternatively, the gateway 108 may be located in the computer 104. Catching incorrectly entered sensitive information in this way and having the sensitive information re-entered properly before it is accepted by the financial institution 112 avoids violating national and international regulations protecting the safe handling of sensitive information.

Figure 2:
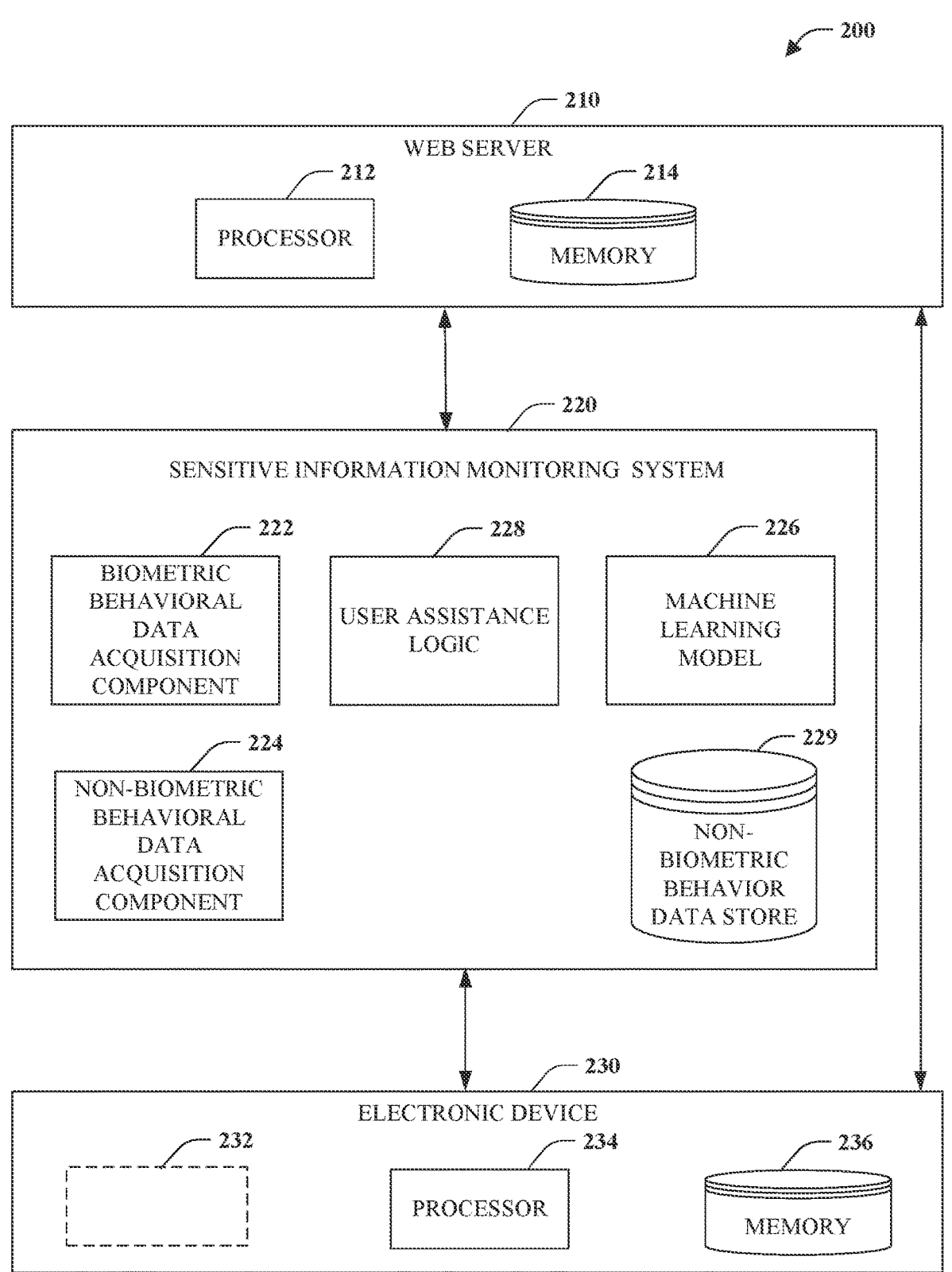
FIG. 2 is a block diagram of a sensitive information monitoring system.

Turning attention to FIG. 2, an example sensitive information monitoring system 200 for protecting sensitive information 232 is illustrated in further detail. The sensitive information 232 can include a social security number (SSN), date of birth, Centers for Medicare and Medicate Services (CMS) certification number (CCN), as well as other private identifying information (PII) of an individual. The sensitive information 232 may also include confidential, secret, top secret information; bank account numbers, SSNs, CCNs, driver's license numbers, passport numbers, various different types of text IDs, including different versions of SSN IDs in other countries; PII and sometimes non-personally identifiable information (NPI); and the like. Customers/users and customer agents assisting customers regularly type or copy the sensitive information 232 into the wrong place without knowing that they are incorrectly typing or copying the sensitive information 232 into an incorrect location. By way of example, agents may be required to take notes when assisting some customers, and some agents add too much material on freeform notes and some of that material may be sensitive information. The example system of FIG. 2 attempts to remedy the incorrect placement and/or copying of sensitive information before the electronic document containing the sensitive information 232 is created or stored. Preventing the violation of national or international regulations governing the proper handling of the sensitive information 232 may prevent violations and protect an organization's reputation.

"Non-biological behavior" as used herein means not "biologic behavior". Non-biometric behavioral data can be the characteristics of the person entering sensitive information into a computer. This non-biometric behavior data creates a unique non-behavioral profile of each end user (e.g., customer), customer agent, and/or digital interaction data, where the digital interaction data captures interaction data between the end user and the customer agent. This non-biometric behavioral data may be used to predict which users, or agents, with a specific non-biometric behavioral data are more or less likely to input sensitive information inappropriately.

As mentioned earlier, non-biometric behavioral data includes age, age ranges, gender, location, time of day, response, and time, as examples of non-biometric behavioral data. Other non-biometric behavioral data can include lack of knowledge, inaccessibility to direct contact with a customer service representative, residential location, fingerprint, voice, iris pattern, and so on. Other non-biometric behavioral data may include current job or other title and position within an organization hierarchy (e.g., CEO, CTO, CFO, VP, Group Manager, Tech Support Staff, Other Staff); current tasks/projects assigned to the User (e.g., High Level Management, Personnel Management, Management of Finances, Product Management, Customer Support, Bug Diagnose and Fix, etc.); normal work hours; normal work locations; average rate of use of enterprise collaborative communication tools; and so on. In other situations, non-biometric information may include bank account numbers in a wrong location, credit card numbers in a wrong location, driver license numbers in a wrong location, passport numbers in a wrong location, various types of number IDs, and the like in wrong locations. Often these numbers are copied and pasted into wrong field versus being typed into a correct field.

In other embodiments, the tracking of user interaction when entering sensitive information into a computer system can include biometric behavioral data, as opposed to non-biographical behavioral data, of how fast a user fills out blocks within a standard form, a frequency the user creates typos or other mistakes, how often the user hesitates or pauses within a block of a form, and the like. Instead of looking at a profile of the person, non-biometric behavior data creates a unique behavioral profile of each end user. This behavioral data may be used to predict which users with a specific biometric behavioral profile are more or less likely to input sensitive information inappropriately. For example, biometrical behavioral data may indicate a person may be entering data in a form field extremely quickly. Alternatively, a person may be going through a form slowly or hesitating and with lots of pauses, or whatever type of biological behavior. This information may be used to determine how likely a user or customer representative is to make a mistake and input this information in an incorrect location within a form. This information/biometric behavior may be used, as discussed below, to display tool tips or some other form of remediation. Instead of placing a tool tip on every single field, the tool tip may just show where the mistake is likely to happen.

Both user-specific non-biometric behavioral data and biometric behavior data can be used to create unique profiles of end users based on their typical online behavior when inputting information when interacting with a business computer system, a banking computer system, a secured computer system, or another computer system that may handle sensitive information. This non-biometric behavioral data and biometric behavior data information can be used to coach end users on what they should or should not input into a specific field. In some cases, tool tips or a more interactive chatbot or overlay is triggered to interact with users and/or show reminders of how to correctly enter personally identifiable information and/or non-personally identifiable information PII/NPI, and the like to be sure the users correctly enter sensitive information.

The example sensitive information monitoring system 200 includes a web server 210, a sensitive information monitoring system 220, and an electronic device 230. In one example configuration, the web server 210 displays a merchant-provided webpage. The webpage includes products or services offered for sale by the merchant and includes functionality to support electronic purchases of the products or services. For example, an end user/customer can interact with the webpage to add items to an electronic shopping cart. To complete the purchase, the customer enters credit card information or other sensitive information that is sent back through the sensitive information monitoring system 220 for further processing.

In one example configuration, the web server 210 and the electronic device 230 include a web server processor 212 and an electronic device processor 234, as well as memory 214 and memory 236, respectively. The web server processor 212 and the electronic device processor 234 may be implemented with solid state devices such as transistors to create processors that implement functions that one of ordinary skill in the art will appreciate are executed in silicon or other materials. Furthermore, the web server processor 212 and the electronic device processor 234 may be implemented with general-purpose processors, digital signal processors (DSPs), application-specific integrated circuits (ASICs), field-programmable gate arrays (FPGAs), or other programmable logic devices, discrete gates or transistor logics, discrete hardware components, or any combination thereof designed to perform the functions described herein. A general-purpose processor may be a microprocessor, but in the alternative, the processor may be any processor, controller, microcontroller, or state machine. The web server processor 212 and the electronic device processor 234 may also be implemented as a combination of computing devices, for example, a combination of a DSP and a microprocessor, a plurality of microprocessors, multi-core processors, one or more microprocessors in conjunction with a DSP core, or any other such configuration as understood by those of ordinary skill in the art.

The storage devices or memory 214 and memory 236 can be any suitable devices capable of storing and permitting the retrieval of data. In one aspect, the storage devices or memory 214 and memory 236 are capable of storing data representing an original website or multiple related websites. Storage media includes volatile and non-volatile, removable and non-removable media implemented in any method or technology for information storage. Storage media includes, but is not limited to, storage devices such as memory devices (e.g., random access memory (RAM), read-only memory (ROM), magnetic storage devices (e.g., hard disk, floppy disk, cassettes, tape . . . ), optical disks and other suitable storage devices.

The sensitive information monitoring system 220 includes a non-biometric behavioral data acquisition component 224, a biometric behavioral data acquisition component 222, a machine learning model 226, a user assistance logic 228, and a non-biometric behavioral data store 229. The non-biometric behavioral data acquisition component 224, biometric behavioral data acquisition component 222, the machine learning model 226, and the user assistance logic 228, can be implemented by a processor coupled to a memory that stores instructions that, when executed, cause the processor to perform the functionality of each component. Further, non-biometric behavioral data acquisition component 224 and the non-biometric behavioral data store 229 can correspond to persistent data structures (e.g., tables) accessible by the machine learning model 226. As such, a computing device is configured to be a special-purpose device or appliance that implements the functionality of the sensitive information monitoring system 220. The non-biometric behavioral data acquisition component 224, biometric behavioral data acquisition component 222, the machine learning model 226, and the user assistance logic 228, can be implemented in silicon or other hardware components so that the hardware and/or software can implement their functionality as described herein.

The non-biometric behavioral data acquisition component 224 is operable to receive, retrieve, or otherwise obtain or acquire data associated with a user's non-biometric behavior data or actions. The data can include, for example, age, age ranges, gender, location, time of day, response, time, as examples of non-biometric data. Other non-biometric data can include lack of knowledge, inaccessibility to direct contact with a customer service representative, residential location, fingerprint, voice, iris pattern, and so on. Other non-biometric behavioral data may include current job or other title and position within an organization hierarchy (e.g., CEO, CTO, CFO, VP, Group Manager, Tech Support Staff, Other Staff); current tasks/projects assigned to the User (e.g., High Level Management, Personnel Management, Management of Finances, Product Management, Customer Support, Bug Diagnose and Fix, etc.); normal work hours; normal work locations; average rate of use of enterprise collaborative communication tools; and so on. The machine learning model 226 and the user assistance logic 228 may use this information to preemptively correct for misplaced sensitive information 232. This information can be used by the machine learning model 226 to determine how likely a user or agent is to make a mistake and input sensitive information in an incorrect location within a document. The user assistance logic 228 may use information from the machine learning model 226 to assist the user in correctly entering sensitive information.

In some situations, the non-biometric behavioral data acquisition component 224 is operable to receive information about a user/customer that is useful to predict when the user/customer may input sensitive information incorrectly. For example, how long a user has been a customer may affect the probability that they will incorrectly enter sensitive information. How often a user interacts with certain digital resources from a website will determine whether they may incorrectly enter sensitive information. Another category of data is the digital interaction data that is discussed below and that involves data between the user/customer and a customer agent.

In other situations, the non-biometric behavioral data acquisition component 224 is operable to receive information about an agent taking information from a user/customer. The more tenured an agent is, the less likely the agent is to make a mistake or make the same mistake a few times. A similar non-biometric behavior occurs with seniority. The more seniority an agent has, the less likely they will enter incorrect sensitive information. Agents and users may come in different shifts so that they are more tired at a certain time of day or day of the week, so they are more prone to make mistakes. The machine learning model 226 may look at the number of customers an agent may have already serviced. After the agent talks to 10 customers, or another number of customers, the agent may be more tired and more prone to making mistakes such as copying and pasting sensitive information into a wrong field.

Similarly, the biometric behavioral data acquisition component 222 is operable to receive, retrieve, or otherwise obtain or acquire data associated with a user's biometric behavior or actions. The data can include, for example, data detecting that a user is filling out a form field extremely quickly, and this may be biometric behavioral data indicating that there is a good chance that a user may enter sensitive information in an incorrect location. Alternatively, a user may be going through or filling out a form too slowly or hesitating and with lots of pauses, or indicate that the user is having trouble filling out an electronic form. The machine learning model 226 and the user assistance logic 228 may use this information to preemptively correct for misplaced sensitive information 232. This information can be used by the machine learning model 226 to determine how likely a user or agent is to make a mistake and input sensitive information in an incorrect location within a document. The user assistance logic 228 may use information from the machine learning model 226 to assist the user in correctly entering sensitive information.

The user assistance logic 228 may use data and information from the non-biometric behavioral data acquisition component 224 and the biometric behavioral data acquisition component 222, and the machine learning model 226 to correct user behavior that might lead to the loss of sensitive information. For example, the user assistance logic 228 may use the non-biometric behavior data and/or biometric behavior to display "tool tips" or some other useful mechanism for the remediation of incorrectly/inappropriately entered sensitive information. Instead of placing a tool tip in a random position or on every single field, the sensitive information monitoring system 220 may just show a tool tip or other useful information where the mistake is likely to happen. The user assistance logic 228 may detect that a customer is struggling through a form or that it is taking an abnormal amount of time to fill out a form that will contain sensitive information. When this is detected by the non-biometric behavioral data acquisition component 224 and the biometric behavior data acquisition component 222, the sensitive information monitoring system 220 may receive inputs/information to cause the user assistance logic 228 to display an interactive chatbot or some other interactive device a user may chat with or ask questions with or otherwise have and interactive conversation with.

In another aspect, the machine learning model 226 may determine whether sensitive information 232 is being entered in an incorrect location or should not be entered at all. Upon this detection, the user assistance logic 228 may flash indications or lights on the electronic device 230 and/or cause the electronic device 230 to make noise or other audible signals. If the machine learning model 226 detects and determines that the user has committed a serious error in the entry of sensitive information 232, the user assistance logic 228 may prevent the user of the electronic device 230 from going to the next page of the electronic form until remediation is performed. For example, the user assistance logic 228 may highlight a field within the form itself where the sensitive information 232 should be entered. Alternatively, or in addition, the user assistance logic 228 may display a message above, or below, or beside the field wherein the sensitive information 232 should be entered. The information will provide the user information on how to properly enter the sensitive information 232. In some instances, the user assistance logic 228 may gray out a "next" button and not allow the user to proceed with the next page until the error is corrected.

In other instances, information may not be biometric behavior information but is information related to a person's actions while using the electronic device 230 that may be classified as non-biometric behavior data. This information may still be detected by the non-biometric behavioral data acquisition component 224 or the biometric behavioral data acquisition component 222. For example, the biometric behavioral data acquisition component 222 may detect an abnormally long pause when the user is working on a form while entering the sensitive information 232, and this may be useful information for the machine learning model 226 to know when determining if the sensitive information 232 may have been entered incorrectly or is likely to be entered incorrectly. Of course, the sensitive information monitoring system 220 may not know what caused the long pause; however, long pauses are a known reason that sensitive information may be incorrectly entered into a form, webpage, and the like. Thus, a long pause may be heavily weighted by the machine learning model 226.

The biometric behavior data acquisition component 222 may detect that the user may take a long pause caused by the user receiving a phone call, someone walks up to the user's cubical or office and starts talking with the user, the user leaves to get a cup of coffee, or another reason. The biometric behavior data acquisition component 222 may detect long pauses that may also be created when a user of a mobile phone receives a text message that distracts the user. Long pauses may also be created when a user switches away from a form to possibly work on another form and then returns to the original form/screen later. The biometric behavioral data acquisition component 222 and the non-biometric behavioral data acquisition component 224 and/or the machine learning model 226 may detect the user interfaced with their text message/opened a text message application which may lead to a long pause. Additionally, the time of day may be more prone to cause a user to incorrectly/inappropriately enter sensitive data, as known by the non-biometric behavioral data acquisition component 224. In other instances, the non-biometric behavioral data acquisition component 224 may determine if the time of day is before the user's lunch time? Right after lunchtime? What day of the week is it? What type of weather may be occurring? Or what is a weather forecast the user may be aware of? All of these times or conditions may affect the accuracy of entering sensitive information. As understood by the machine learning model 226, the day of the week may affect a person's accuracy of entering sensitive data so that a person may have more errors on a Monday or if it is late on a Friday. The first form an agent works on in the morning may be prone to sensitive information errors as is the 400th form late in the day. The day before a holiday and seasonality also may cause sensitive information to be entered incorrectly, or less incorrectly, depending on aspects of the timing and the individual.

In other aspects, the non-biometric behavioral data acquisition component 224 may monitor background noise and may monitor devices such as Amazon's Alexa. The non-biometric behavioral data acquisition component 224 may monitor an agent interfacing with a user. For example, non-biometric behavioral data acquisition component 224 and the machine learning model 226 may detect what time of a day it currently is, is before lunch time, is right after lunch time, what day of the week, and weather may affect the accuracy of inputting sensitive information into an electronic device or form. Does the agent sound tired, angry, detect mood, voice frequency and fluctuations, or does the agent display another mood? The machine learning model 226 may monitor the agent's voice frequency, voice fluctuations, and other attributes. All of the above factors may be taken into account by the machine learning model 226 when determining if sensitive data has or may be improperly entered.

In one configuration, the sensitive information monitoring system 220 includes the non-biometric behavioral data acquisition component 224 and the biometric behavioral data acquisition component 222 to collect both non-biometric behavior data and biometric behavior data about how a user interacts with the electronic device 230. The machine learning model 226 may perform natural language processing associated with the sensitive information. The machine learning model 226 determines if sensitive information may not be entered correctly based on the non-biometric behavior information and biometric behavior information and natural language processing. The user assistance logic 228 prompts the user on how to enter the sensitive information when the machine learning model 226 determines that the sensitive information 232 may not be entered correctly. For example, the user assistance logic 228 may display information on the electronic device 230, when the sensitive information 232 may not be entered correctly, explaining how to enter the sensitive information 232. The user assistance logic 228 may display a chatbot on the electronic device to permit chat as to how to enter the sensitive information.

The machine learning model 226 is operable to analyze the input of sensitive information 232 and compute a risk score and determine if the risk score may cross a threshold level (e.g., exceeds a threshold level). The risk score is a value that indicates the likelihood that an item on a form, website, or the like, was sensitive information that was entered incorrectly. In other words, the risk score is a value that captures the probability that the sensitive information 232 was entered incorrectly. For example, the machine learning model 226 can employ one or more rules to compute the risk score.

Various portions of the disclosed systems above and methods below can include or employ artificial intelligence or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the sensitive information monitoring system 220 of FIG. 2 can employ such mechanisms to automatically determine a risk score that is associated with the risk of sensitive information being placed in the wrong location or that the sensitive information should have been entered into a form or webpage at all.

Figure 3:
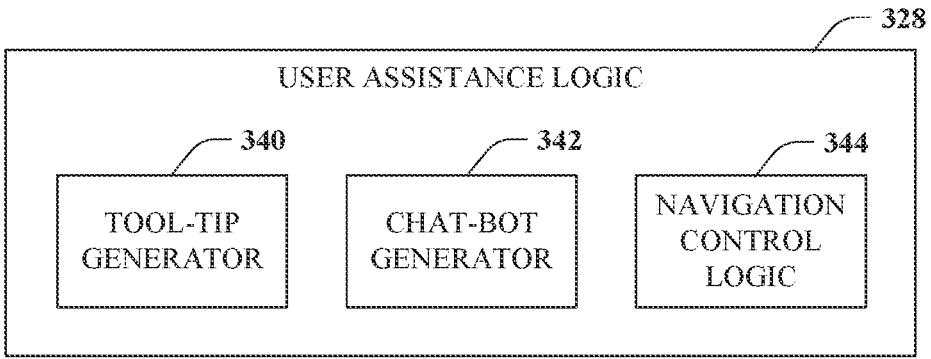
FIG. 3 is a block diagram of an example user assistance logic.

The user assistance logic 228 of FIG. 2 is now described in more detail with reference to FIG. 3. The user assistance logic 328 of FIG. 3 includes a tooltip generator 340, a chatbot generator 342, and a navigation control logic 344. The tooltip generator is configured to create textual content to be displayed to a user of an electronic device to provide the user textual guidance on how to enter sensitive information. The tooltip generator 340 can provide textual guidance near where the sensitive information is input on a form, webpage, and the like. The chatbot generator 342 may generate a chatbot for interacting with a user with guidance concerning how to enter or correctly enter sensitive information when a machine learning logic determines that sensitive may have been incorrectly entered at an electronic device.

The navigation control logic 344 may control how information is entered in a form, webpage, or the like. For example, if a machine learning model determines that sensitive information may have been incorrectly entered into a form, the navigation control logic 344 may not allow a user to enter any more data or information until the incorrectly entered sensitive information is remedied. In other aspects, the navigation control logic 344 may lock the page by graying out the "next page" button and not allowing the user to proceed to the next page until the sensitive information is entered correctly.

Figure 4:
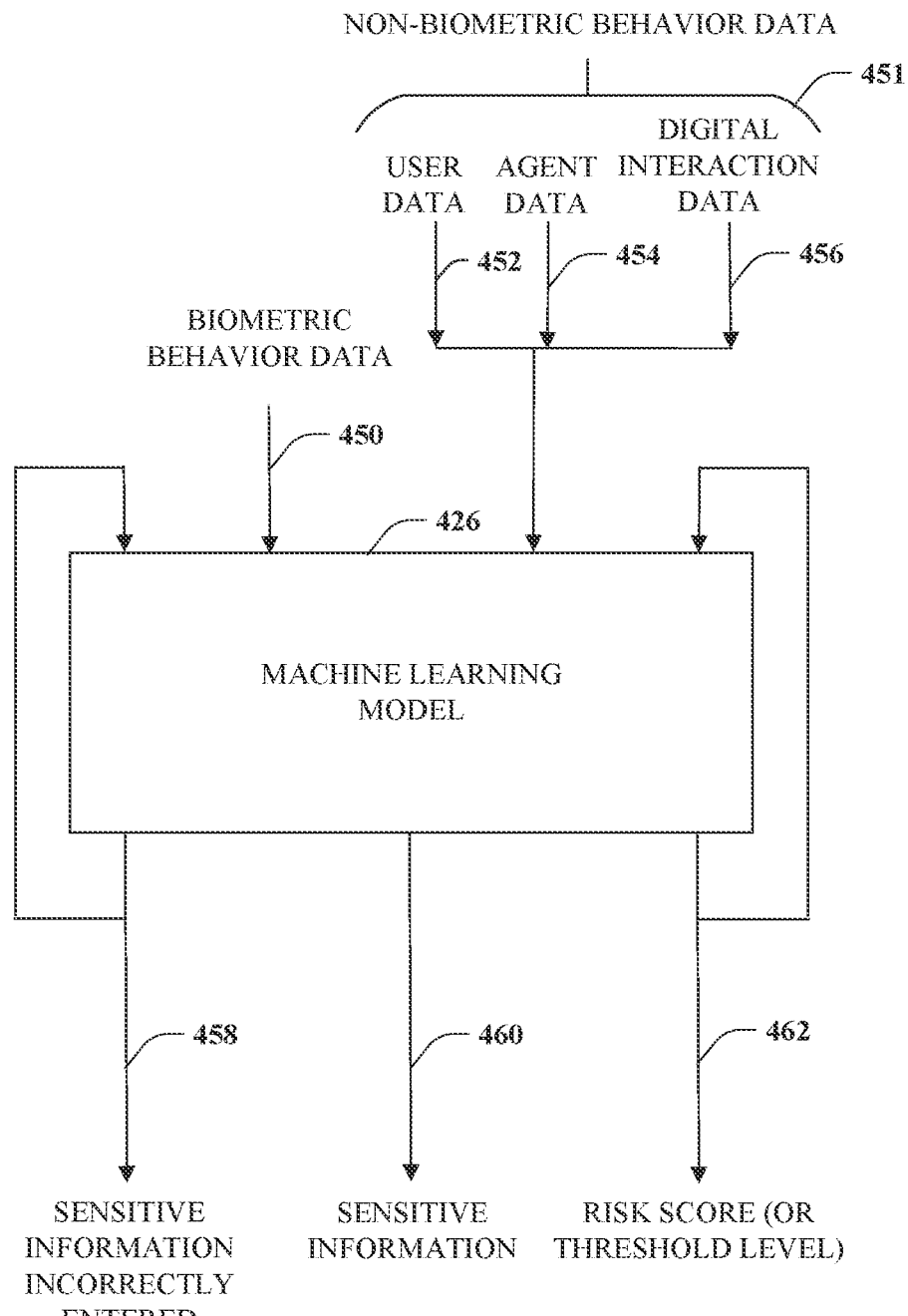
FIG. 4 is a block diagram of an example machine learning model.

FIG. 4 depicts the machine learning model 426 in accordance with an example particular embodiment. The machine learning model 426 is used to prevent end computer system users from accidentally incorrectly inputting and submitting sensitive information. This helps to prevent users from incorrectly entering sensitive information at the source and eliminates the requirement of cleaning up incorrectly entered sensitive information after the sensitive information has already been committed to a form, stored in memory, or the like.

Biometric behavior data 450 are a primary input to the machine learning model 426. Instead of looking at a profile of the person, biometric behavior captures a profile of the person's behavior profile. Non-biometric behavior data 451 are also a primary input into the machine learning model 426. In general, non-biometric behavior data captures a profile unique to an individual. Non-biometric behavior data 451 may include three types of data. This data includes user information 452 (or customer information), agent information 454, and digital interaction data 456.

The machine learning model 426 is trained on the biometric behavior data 450, user information 452, agent information 454, and the digital interaction data 456 for predicting a likelihood of end users inappropriately inputting sensitive information into a computer system. The digital interaction data 456 includes data about how a user/customer interacts with a customer agent, which includes data associated with the interaction between the user and the agent. For example, the digital interaction data 456 may include information about how often a user interacts with a website or application associated with a customer agent, how often they engage on the site, and may include data on an IP address of the user/customer because the user/customer has interfaced with the customer agent before and realizes the current IP address is the same IP address. All of this data may enter the machine learning model 226, and then the model makes a prediction on how often this customer is likely to make a mistake entering sensitive information. Depending on the score, a tool tip may be displayed. Coaching a user/customer may be prompted by this information.

The machine learning model 426 outputs a signal of whether sensitive information is not entered correctly or inappropriately (sensitive information incorrectly entered 458). The machine learning model 426 also outputs the sensitive information 460 that may have been incorrectly entered. The machine learning model 426 also outputs a risk score that indicates how confident the machine learning model 462 is that the determination is correct. Based on the risk score, the machine learning model 426 may display textual or "tool tips" that may be displayed near where the sensitive information was incorrectly input to prompt the user on how to enter the sensitive information correctly. In another example, a chatbot may be presented to interact with the user to prevent the inappropriate entering of personally identifiable information.

Figure 5:
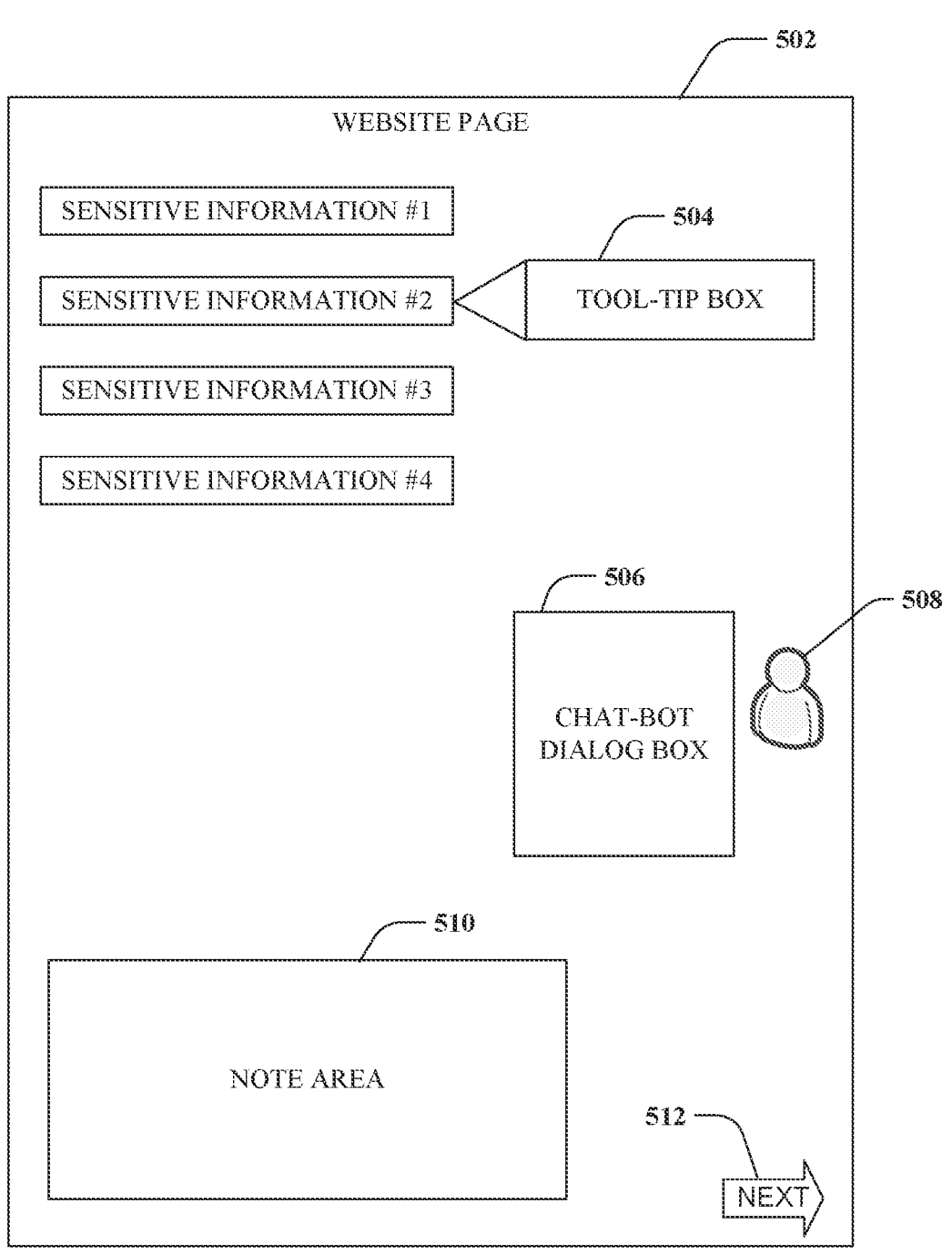
FIG. 5 is an example website page for entering sensitive information.

FIG. 5 illustrates one example of a website page 502 where a user may enter sensitive information. The website page 502 is one example way a user may enter sensitive information. Other ways include through electronic documents, through software windows, and in other ways as understood by those of ordinary skill in the art. The user may be entering sensitive information into one or more sensitive information fields #1-4. Of course, other website pages may have more or fewer sensitive information fields. In aspects of the configurations disclosed here, the user may input incorrect information in sensitive information field #2, for example.

When the systems and methods described herein detect the entering of the incorrect sensitive information into sensitive information field #2, a tool tip window 504 may be displayed on the website page 502 near sensitive information field #2 that may instruct the user what to enter into sensitive information field #2. In some instances, when incorrect sensitive information is detected in this field, sensitive information fields #3 and 4 may be locked until the user has remedied the sensitive information that was entered into sensitive information field #2 and/or how to enter that information. In some instances, the method or system may gray out a next button 512 and not proceed with a next field until the sensitive information error is corrected. If the systems and methods described above and below detect that the user is still having difficulty entering the correct sensitive information into sensitive information field #2, then a chatbot text window 506 and icon 508 may be displayed to allow the user to ask for more specific advice tailored to that user about how to remedy the input of incorrect sensitive information.

In other instances, the website page 502 may further include a note area 510. This is an area a customer representative may place notes concerning a user they are assisting. In general, sensitive information should not be placed in this note area 510. Thus, the methods and systems may monitor this note area 510 and display appropriate messaging to the customer agent when inappropriate sensitive information is detected in this area. Of course, lighting alerts, coloring alerts, audio alerts, and the like may be used to alert a user of the website page 502 when sensitive information is inappropriately placed on or in a wrong location on the website page 502.

Figure 6:
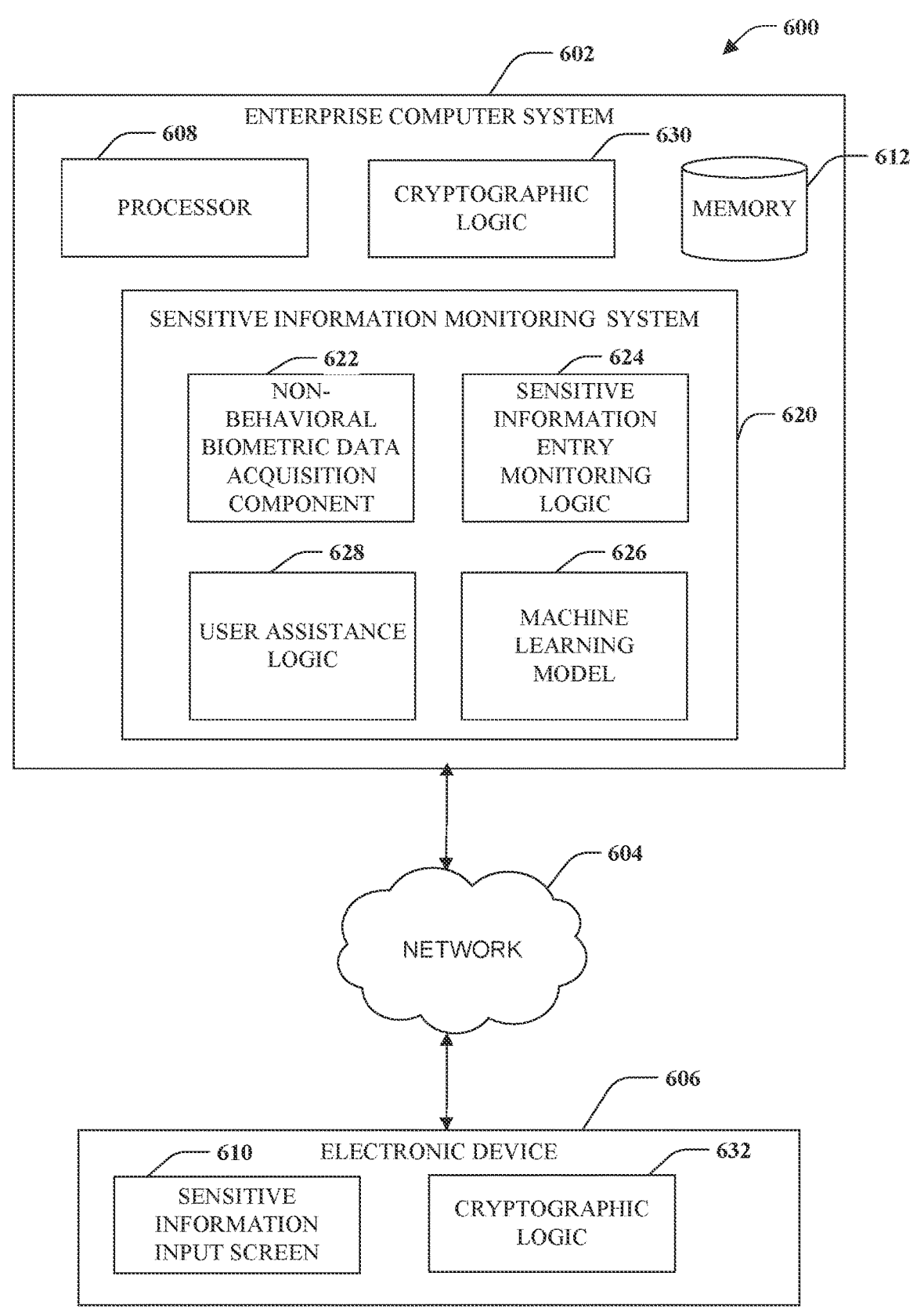
FIG. 6 is a block diagram of another sensitive information monitoring system.

FIG. 6 illustrates another example system 600 for correcting sensitive information that was improperly entered into an electronic form, website, an electronic device, and the like. The example system 600 includes an enterprise computer system 602, a network 604, and an electronic device 606. In some configurations, the sensitive information monitoring system 620 may, instead, be located in the electronic device 230.

The network 604, allows the enterprise computer system 602 and the electronic device 606 to communicate with each other. The network 604 may include portions of a local area network such as an Ethernet, portions of a wide area network such as the Internet, and may be a wired, optical, or a wireless network. The network 604 may include other components and software as understood by those of ordinary skill in the art.

The enterprise computer system 602 includes a processor 608, cryptographic logic 630, a memory 612, and a sensitive information monitoring system 620. The processor 608 may be implemented with solid state devices such as transistors to create a processor that implements functions that one of ordinary skill in the art will appreciate are executed in silicon or other materials. Furthermore, the processor 608 may be implemented with a general-purpose processor, a digital signal processor (DSP), an application-specific integrated circuit (ASIC), a field-programmable gate array (FPGA), or another programmable logic device, discrete gates or transistor logics, discrete hardware components, or any combination thereof designed to perform the functions described herein.

The memory 612 can be any suitable device capable of storing and permitting the retrieval of data. In one aspect, the memory 612 is capable of storing sensitive information input to an electronic form, a website, software, or in another way. Storage media includes volatile and non-volatile, removable and non-removable media implemented in any method or technology for storage of information. Storage media includes, but is not limited to, storage devices such as memory devices (e.g., random access memory (RAM), read-only memory (ROM), magnetic storage devices (e.g., hard disk, floppy disk, cassettes, tape . . . ), optical disks and other suitable storage devices.

The electronic device 606 includes a sensitive information input screen 610 and cryptographic logic 632. The sensitive information input screen 610 may be any suitable software such as a website page, electronic form, or another display on the electronic device 606 for entering sensitive data. In some embodiments, the sensitive information input screen 610 may include an audio input device such as a microphone that may be spoken into or any other device that captures a user's thoughts and that converts the thoughts into an electronic format.

Cryptographic logic 630 and cryptographic logic 632 in the enterprise computer system 602 and the electronic device 606, respectively, allow the enterprise computer system 602 and the electronic device 606 to send encrypted data including sensitive information and personally identifiable information (PII) between them. Cryptographic logic 630 and cryptographic logic 632 are operable to produce encrypted sensitive information by way of an encryption algorithm or function. The cryptographic logic 632 of the electronic device 606 can receive, retrieve, or otherwise obtain the sensitive information from the sensitive information input screen 610. An encryption algorithm is subsequently executed to produce an encrypted value representative of the encoded sensitive data. Stated differently, the original plaintext of the combination of encoded sensitive information is encoded into an alternate cipher text form. For example, the Advanced Encryption Standards (AES), Data Encryption Standard (DES), or another suitable encryption standard or algorithm may be used. In one instance, symmetric-key encryption can be employed in which a single key both encrypts and decrypts data. The key can be saved locally or otherwise made accessible by cryptographic logic 630 and cryptographic logic 632. Of course, an asymmetric-key encryption can also be employed in which different keys are used to encrypt and decrypt data. For example, a public key for a destination downstream function can be utilized to encrypt the data. In this way, the data can be decrypted downstream at a user device, as mentioned earlier, utilizing a corresponding private key of a function to decrypt the data. Alternatively, a downstream function could use its public key to encrypt known data.

The example system 600 may provide an additional level of security to the encoded data by digitally signing the encrypted sensitive information. Digital signatures employ asymmetric cryptography. In many instances, digital signatures provide a layer of validation and security to messages (i.e., sensitive information) sent through a non-secure channel. Properly implemented, a digital signature gives the receiver reason to believe the message was sent by the claimed sender.

Digital signature schemes, in the sense used here, are cryptographically based, and must be implemented properly to be effective. Digital signatures can also provide non-repudiation, meaning that the signer cannot successfully claim they did not sign a message, while also claiming their private key remains secret. In one aspect, some non-repudiation schemes offer a timestamp for the digital signature, so that even if the private key is exposed, the signature is valid.

Digitally signed messages may be anything representable as a bit-string such as encrypted sensitive information. Cryptographic logic 630 and cryptographic logic 632 may use signature algorithms such as RSA (Rivest-Shamir-Adleman), which is a public-key cryptosystem that is widely used for secure data transmission. Alternatively, the Digital Signature Algorithm (DSA), a Federal Information Processing Standard for digital signatures, based on the mathematical concept of modular exponentiation and the discrete logarithm problem may be used. Other instances of the signature logic may use other suitable signature algorithms and functions.

The sensitive information monitoring system 620 includes a non-behavioral biometric data acquisition component 622, a sensitive information entry monitoring logic 624, a machine learning model 626, and a user assistance logic 628. The non-behavioral biometric data acquisition component 622, the sensitive information entry monitoring logic 624, the machine learning model 626, and the user assistance logic 628, can be implemented by a processor coupled to a memory that stores instructions that, when executed, cause the processor to perform the functionality of each component or logic. The non-behavioral biometric data acquisition component 622, the sensitive information entry monitoring logic 624, the machine learning model 626, and the user assistance logic 628, can be implemented in silicon or other hardware components so that the hardware and/or software can implement their functionality as described herein.

The non-behavioral biometric data acquisition component 622 is operable to receive, retrieve, or otherwise obtain or acquire data associated with a user's biometric behavior or actions. Non-biometric behavioral data includes age, age ranges, gender, location, time of day, response, time, as examples of non-biometric behavioral data. Additionally, other non-biometric behavioral data can include lack of knowledge, inaccessibility to direct contact with a customer service representative, residential location, fingerprint, voice, iris pattern, and so on. Other non-behavioral data may include current job or other title and position within an organization hierarchy (e.g., CEO, CTO, CFO, VP, Group Manager, Tech Support Staff, Other Staff); current tasks/projects assigned to the User (e.g., High Level Management, Personnel Management, Management of Finances, Product Management, Customer Support, Bug Diagnose and Fix); normal work hours; normal work locations; average rate of use of enterprise collaborative communication tools; and so on. The non-behavioral biometric data acquisition component 622, the machine learning model 626, and user assistance logic 628 may use this information to preemptively indicate to the user to correct for misplaced sensitive information. This information can be used by the machine learning model 626 to determine how likely a user or agent is to make a mistake and input sensitive information in an incorrect location within a document. The user assistance logic 628 may use information from the machine learning model 626 to assist the user in correctly entering sensitive information.

The user assistance logic 628 may use data and information from the non-behavioral biometric data acquisition component 622 and the machine learning model 626 to prompt the user to correct user behavior that might lead to the loss of sensitive information. For example, the user assistance logic 628 may use the information/biometric behavior to display tool tips or some other form of prompting for remediation. Instead of placing a tool tip on every single field, the user assistance logic 628 may place a tool tip near where the inappropriate use of sensitive information is likely to happen. The user assistance logic 628 may detect that a customer is struggling through a form or that it is taking an abnormal amount of time to fill out a form that will contain sensitive information. When this is detected, the user assistance logic 628 may display an interactive chatbot or some other interactive device a user may chat with or ask questions with or otherwise have an interactive conversation with.

In another aspect, the sensitive information entry monitoring logic 624 and machine learning model 626 may determine whether sensitive information is being entered in an incorrect location or should not be entered at all. Upon this detection, the user assistance logic 628 may flash indications or lights on the electronic device 606 and/or cause the electronic device 606 to make audio sounds such as beeps. If the sensitive information entry monitoring logic 624 and machine learning model 626 detect and determine that the user has committed a serious error in the entry of sensitive information, the user assistance logic 628 may prevent the user of the electronic device 606 from going to the next page or require remediation before any more information is entered. For example, the user assistance logic 628 may highlight a field within the form itself where the sensitive information should be corrected. Alternatively, or in addition, the user assistance logic 628 may display a message above or below the field where the sensitive information should be corrected. In some instances, the user assistance logic 628 may gray out a "next" button and not proceed with the next field until the error is corrected.

In other instances, information that may not be non-biometric behavior information but is information related to a person's action while using the electronic device 606 may still be detected by the non-behavioral biometric data acquisition component 622. For example, a logic similar to the non-behavioral biometric data acquisition component 622 may detect biometric behavior data that indicates an abnormally long pause when the user is working on a form while entering sensitive information, and this may be useful information for the machine learning model 626 to know when determining if sensitive information may have been entered incorrectly. Of course, the sensitive information monitoring system 620 may not know what caused the long pause; however, long pauses are a known reason sensitive information may be incorrectly entered into a form, webpage, and the like. Thus, a long pause may be heavily weighted by the machine learning model 626.

The machine learning model 626 is operable to analyze the input of sensitive information and compute a risk score and determine if the risk score crosses a threshold level (e.g., exceeds a threshold level). The risk score is a value that indicates the likelihood that an item on a form, website, or the like, was sensitive information that was entered incorrectly. In other words, the risk score is a value that captures the probability that sensitive information was entered incorrectly. For example, the machine learning model 626 can employ one or more rules to compute the risk score.

Various portions of the disclosed systems above and methods below can include or employ artificial intelligence or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the sensitive information monitoring system 620 of FIG. 6 can employ such mechanisms to automatically determine a risk score that is associated with the risk of sensitive information being placed in the wrong location or if the sensitive information should have been entered into a form or webpage at all.

The aforementioned systems, architectures, platforms, environments, or the like have been described with respect to interaction between several logics and components. It should be appreciated that such systems and components can include those logics and/or components or sub-components and/or sub-logics specified therein, some of the specified components or logics or sub-components or sub-logics, and/or additional components or logics. Sub-components could also be implemented as components or logics communicatively coupled to other components or logics rather than included within parent components. Further yet, one or more components or logics and/or sub-components or sub-logics may be combined into a single component or logic to provide aggregate functionality. Communication between systems, components or logics and/or sub-components or sub-logics can be accomplished following either a push and/or pull control model. The components or logics may also interact with one or more other components not specifically described herein for the sake of brevity but known by those of skill in the art.

Figure 7:
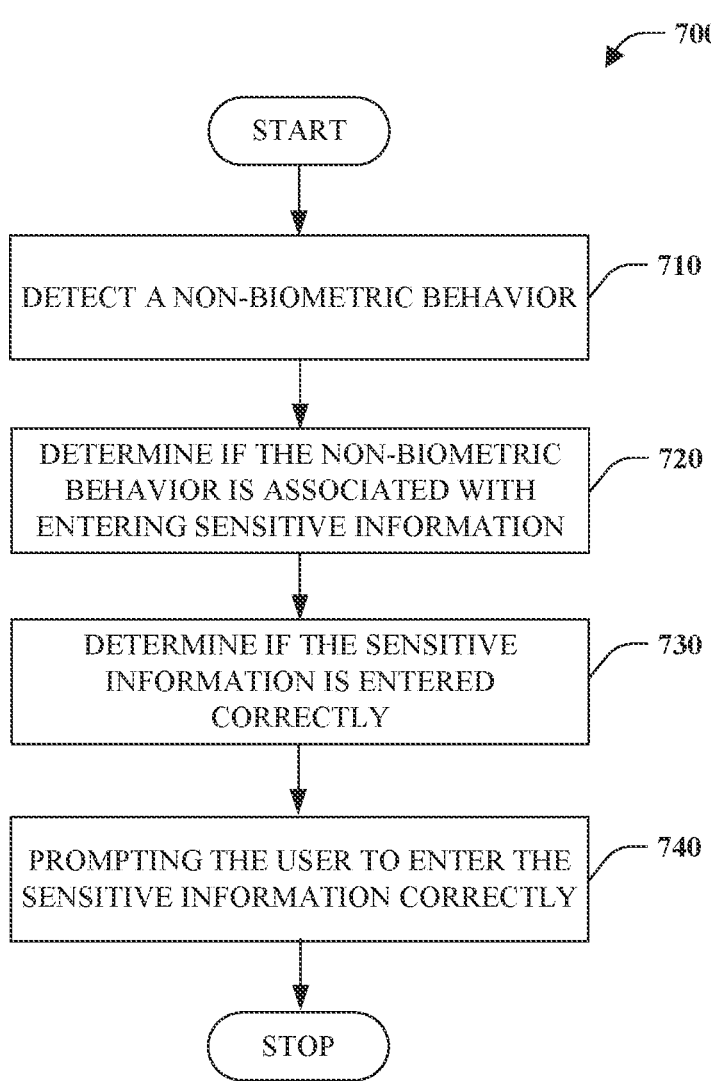
FIG. 7 is a flow chart diagram of a sensitive information monitoring method.
Figure 8:
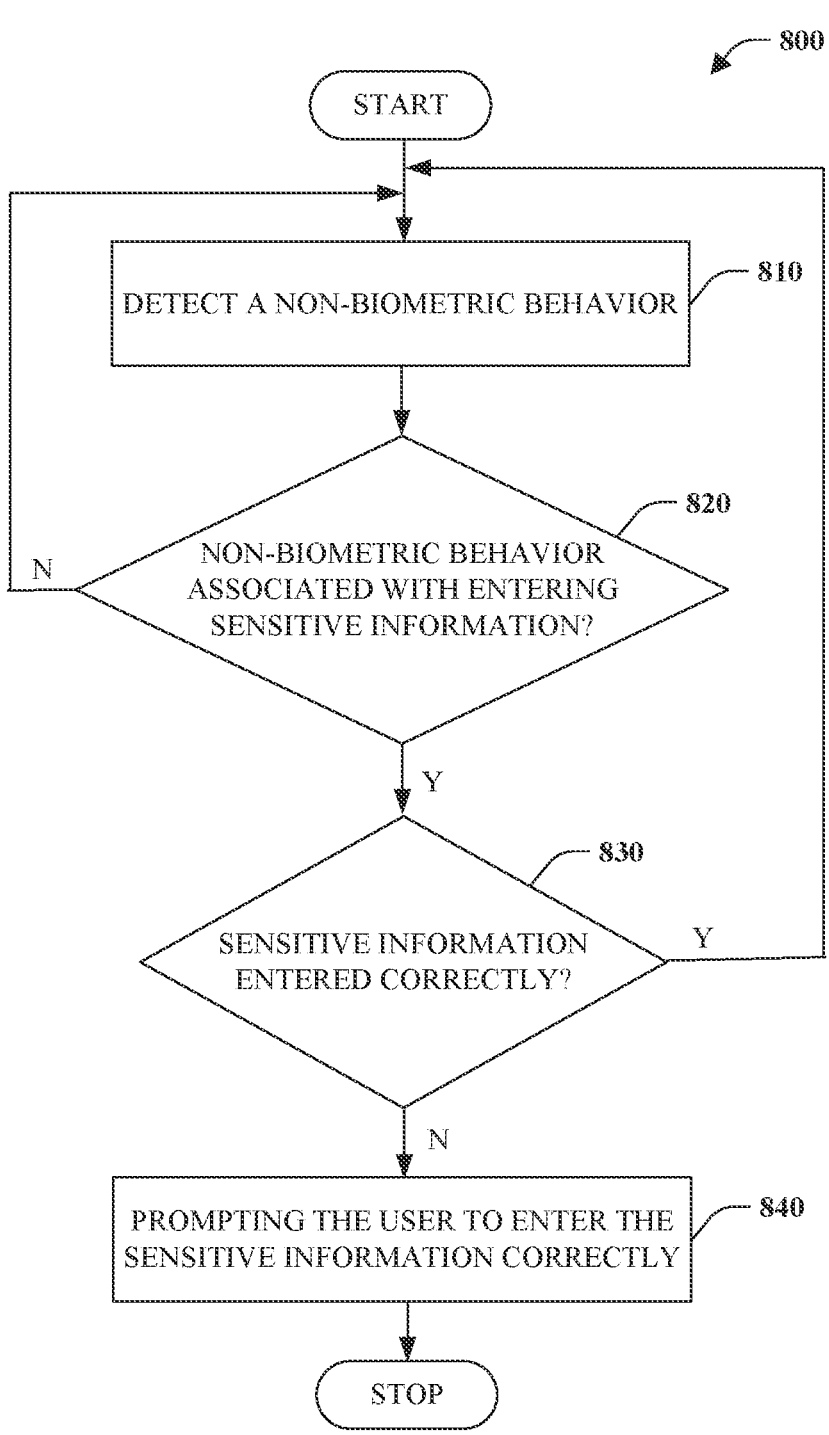
FIG. 8 is a flow chart diagram of another sensitive information monitoring method.
Figure 9:
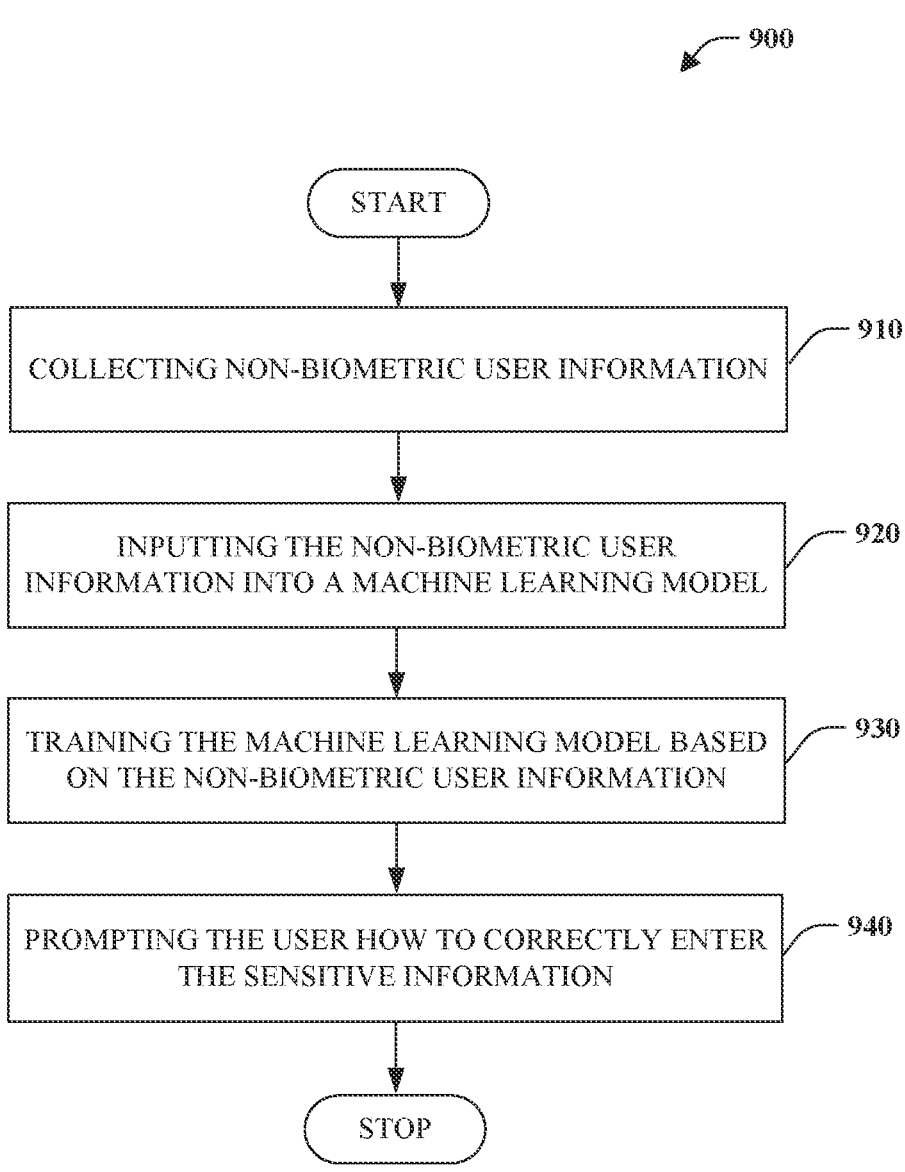
FIG. 9 is a flow chart diagram of another sensitive information monitoring method.

In view of the example systems described above, methods that may be implemented in accordance with the disclosed subject matter will be better appreciated with reference to flow chart diagrams of FIGS. 7-9. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 7, a method 700 for monitoring and preventing the incorrect entering of sensitive information is depicted in accordance with an aspect of this disclosure. The method 700 for monitoring and preventing the incorrect entering of sensitive information can be performed by the example sensitive information monitoring system 200, as discussed above with reference to FIG. 2.

At reference numeral 710, non-biometric behavior of a user is detected. Non-biometric behavior can be defined as non-biometric data that creates a unique profile of each end user. This non-biometric behavior data may be used to predict which users with specific non-biometric behavioral data are more or less likely to input sensitive information inappropriately. As mentioned above, non-biometric behavioral data includes age, age ranges, gender, location, time of day, response, time, as examples of non-biometric behavioral data. Additionally, other non-biometric behavioral data can include lack of knowledge, inaccessibility to direct contact with a customer service representative, residential location, fingerprint, voice, iris pattern, and so on.

A determination is made, at reference numeral 720, if the non-biometric behavior data is associated with entering sensitive information. As discussed above, a machine learning model may play a role in making this determination. In other embodiments, other customer information, agent information, and/or digital interaction data may be used. Digital interaction data may include data on how the customer and/or agent interact using electronic devices to communicate together.

When the non-biometric behavior is associated with entering sensitive information, the method 700 determines, at reference numeral 730, if the sensitive information is entered incorrectly. In some instances, a machine learning model may perform the determining if the sensitive information is entered incorrectly. Some configurations may determine if the sensitive information is entered incorrectly using the non-biometric behavior and natural language processing. The sensitive information may be determined to be entered incorrectly using the non-biometric behavior data and a known syntax of the sensitive information.

If the sensitive information is entered incorrectly, the method 700 prompts, at reference numeral 740, for the user to enter the sensitive information correctly. The user may be prompted on how to enter the sensitive information correctly using a text window. Other aspects prompt the user with a chatbot on how to enter the sensitive information correctly. In some aspects, a determination is made if the sensitive information is entered incorrectly and if this determination has an acceptable risk score or is below an acceptable threshold level. When the entering of sensitive information does not have an acceptable risk score or is below the acceptable threshold level, the method 700 prompts the user on how to enter the sensitive information correctly.

Other configurations of the method 700 may include other useful features and functionality. For instance, when the sensitive information is entered incorrectly, the user can be prevented from moving to a next screen until the sensitive information is entered correctly. In some aspects, a light indicator may be generated when sensitive information is entered incorrectly. In other aspects, an audible indicator or a tactile indicator may be created when sensitive information is entered incorrectly.

FIG. 8 depicts a method 800 for monitoring and preventing the incorrect entering of sensitive information. The method 800 can be implemented and performed by the example sensitive information monitoring system 200 of FIG. 2 for monitoring and preventing the incorrect entering of sensitive information.

At reference numeral 810, non-biometric behavior data of a user is detected. Non-biometric behavior can be defined as non-biometric data that creates a unique profile of each end user. This data may be used to predict which users with a specific non-behavioral data that are more or less likely to input sensitive information inappropriately. Non-biometric behavioral data includes age, age ranges, gender, location, time of day, response, time, as examples of non-biometric behavioral data. Additionally, other non-biometric behavioral data can include lack of knowledge, inaccessibility to direct contact with a customer service representative, residential location, fingerprint, voice, iris pattern, and so on.

A determination is made, at reference numeral 820, if biometric behavior is associated with entering sensitive information. When the non-biometric behavior is not associated with entering sensitive information, flow returns to the start. When the non-biometric behavior is associated with entering sensitive information, the method 800 determines, at reference numeral 830, if the sensitive information is entered incorrectly. If the sensitive information is entered correctly, flow returns to the start. If the sensitive information is entered incorrectly, the method 800 prompts, at reference numeral 840, the user to enter the sensitive information correctly. The user may be prompted on how to enter the sensitive information correctly using a text window. Other aspects prompt the user with a chatbot on how to correctly enter the sensitive information or prompt the user in other ways, as discussed above, how to enter the sensitive information correctly.

FIG. 9 depicts an example method 900 of monitoring and preventing the incorrect entering of sensitive information. The example method 900 can be performed by the example system 600 of FIG. 6 for correcting sensitive information that was improperly entered into an electronic form, website, an electronic device, and the like, as discussed above.

At reference numeral 910, non-biometric behavioral user information is collected from a computer system associated with a user. In some instances, the non-biometric user information is associated with the user interacting with an agent. The example method 900 may involve collecting non-biometric user information associated with entering sensitive information at a website or on a standard form such as an electronic form.

The non-biometric user information is input, at reference numeral 920, into a machine learning model. The example method 900 trains, at reference numeral 930, the machine learning model based on the non-biometric user information. The machine learning model is trained to predict when the user has a threshold chance of incorrectly inputting sensitive information into the computer system.

The user is prompted, at reference numeral 940, how to correctly enter the sensitive information, when the threshold chance is exceeded. In some instances, the example method 900 adds a popup dialog window for describing how to enter the sensitive information correctly. The user may be prompted on how to enter sensitive information containing personally identifiable information.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
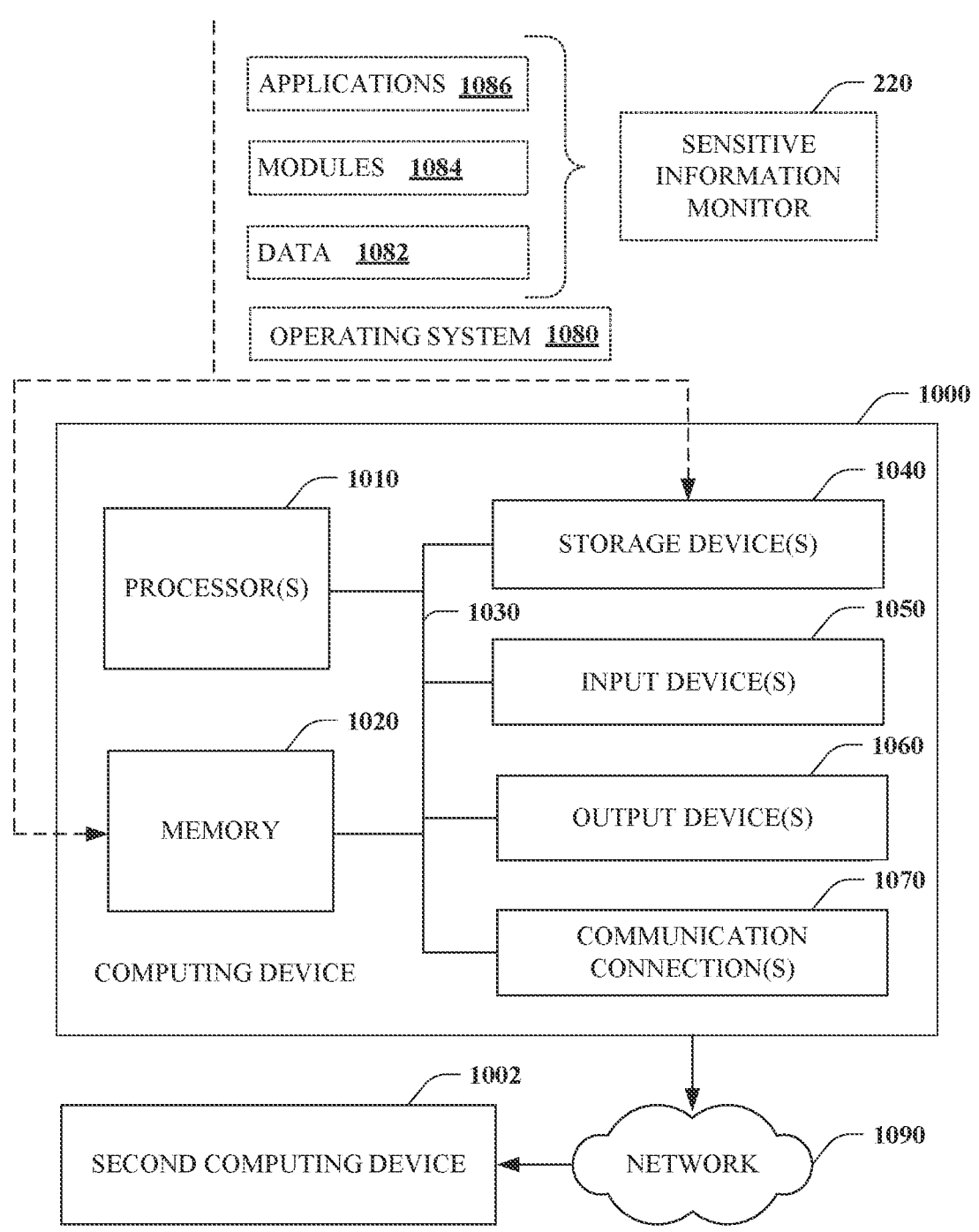
FIG. 10 is a block diagram illustrating a suitable operating environment for aspects of the subject disclosure.

To provide a context for the disclosed subject matter, FIG. 10, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all, aspects of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node, . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer-executable actions, instructions, and or components stored in the memory 1020.

The processor(s) 1010 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example, a combination of a DSP and a microprocessor, a plurality of microprocessors, multi-core processors, one or more microprocessors in conjunction with a DSP core, or any other such configuration. In one configuration, the processor(s) 1010 can be a graphics processor unit (GPU) that performs calculations concerning digital image processing and computer graphics.

The computing device 1000 can include or otherwise interact with a variety of computer-readable media to facilitate control of the computing device to implement one or more aspects of the disclosed subject matter. The computer-readable media can be any available media accessible to the computing device 1000 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storing information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1000, such as during start-up, can be stored in non-volatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the sensitive information monitor 132 can be, or form part of, the application 1086, and include one or more program modules 1084 and data 1082 stored in memory and/or storage device(s) 1040 whose functionality can be realized when executed by one or more processor(s) 1010.

In accordance with one particular configuration, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the sensitive information monitor 132 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth, . . . ), or a combination thereof.

The computing device 1000 can also include communication connection(s) 1070 to enable communication with at least a second computing device 1002 utilizing a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In one instance, the computing device 1000 can execute a sensitive information monitor 132 for a first function, and the second computing device 1002 can execute a sensitive information monitor 132 for a second function in a distributed processing environment. Further, the second computing device can provide a network-accessible service that stores source code, and encryption keys, among other things, that can be employed by the sensitive information monitor 132 executing on the computing device 1000.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
a processor coupled to a memory that includes instructions associated with user assistance that are executable by the processor to cause the processor to:
detect interaction with an electronic form by a user;
determine non-biometric behavioral data of the user, wherein the non-biometric behavioral data of the user includes digital interaction data representing how the user interacts with a customer agent;
invoke a machine learning model based on the non-biometric behavioral data of the user including the digital interaction data representing how the user interacts with the customer agent, wherein the machine learning model has been trained to (i) predict a likelihood that the user will enter sensitive data in an electronic form field inappropriately, such that the sensitive data will be unmasked, by comparing similarities of the non-biometric behavioral data of the user to non-biometric behavioral data of other users, including past interactions of the other users with the electronic form, and (ii) output the sensitive data after determining that the user incorrectly entered the sensitive data in the electronic form field; and
initiate user assistance by receiving questions from the user via an interactive display and responding to the user with information that mitigates risk of inappropriate entry of sensitive data in the electronic form field when the likelihood satisfies a predetermined threshold.

2. The system of claim 1, wherein the user assistance corresponds to a message that provides information regarding sensitive data input.

3. The system of claim 1, wherein the user assistance corresponds to a chatbot that informs the user how to enter sensitive data correctly.

4. The system of claim 1, wherein the instructions further cause the processor to:
detect an electronic form field with inappropriate sensitive data; and
request the user remove the sensitive data from the electronic form field.

5. The system of claim 4, wherein the instructions further cause the processor to prevent further input into another electronic form field until the sensitive data is removed.

6. The system of claim 5, wherein the instructions further cause the processor to prevent the user from moving to a next screen until the sensitive data is removed.

7. The system of claim 1, wherein the instructions further cause the processor to perform natural language processing to identify sensitive data entered incorrectly.

8. The system of claim 5, wherein the instructions further cause the processor to activate a light or audible indicator when the sensitive data is entered incorrectly.

9. The system of claim 1, wherein the non-biometric behavioral data further includes at least one of customer data or customer service agent data, wherein the digital interaction data representing how the user interacts with the customer agent includes:
data associated with the interaction between the user and the customer agent;
data representing how often the user interacts with a website or application associated with the customer agent; and
data representing an internet protocol (IP) address of the user; and
wherein determining that the user incorrectly entered the sensitive data in the electronic form field includes determining that the user accidentally and incorrectly entered the sensitive data in the electronic form field.

10. The system of claim 1, wherein the digital interaction data comprises digital engagement analytics including at least one of time of engagement, frequency of engagement, or frequency of data violations.

11. A method, comprising:
executing on a processor, instructions that cause the processor to perform operations, the operations comprising:
detecting interaction with an electronic form by a user;
determining non-biometric behavioral data of the user comprising profile data and digital interaction data representing how the user interacts with a customer agent;
invoking a machine learning model based on the non-biometric behavioral data of the user comprising the profile data and the digital interaction data representing how the user interacts with the customer agent, wherein the machine learning model has been trained to (i) predict a likelihood that the user will enter sensitive data in an electronic form field inappropriately, such that the sensitive data will be unmasked, by comparing similarities of the non-biometric behavioral data of the user to non-biometric behavioral data of other users, including past interactions of the other users with the electronic form, and (ii) output the sensitive data after determining that the user incorrectly entered the sensitive data in the electronic form field; and
triggering user assistance by receiving questions from the user via an interactive display and responding to the user with information that mitigates risk of inappropriate entry of sensitive data in the electronic form field when the likelihood satisfies a predetermined threshold.

12. The method of claim 11, wherein the operations further comprise triggering display of a tooltip associated with the electronic form field as the user assistance to indicate a likelihood that the sensitive data will be inappropriately included in the field.

13. The method of claim 11, wherein the operations further comprise invoking a chatbot to inform the user on how to enter sensitive data correctly.

14. The method of claim 11, wherein the operations further comprise displaying a message that provides information regarding sensitive data input as the user assistance.

15. The method of claim 11, further comprising determining customer service agent data as part of the non-biometric behavioral data, wherein the digital interaction data representing how the user interacts with the customer agent includes:

data associated with the interaction between the user and the customer agent;

data representing how often the user interacts with a website or application associated with the customer agent; and data representing an internet protocol (IP) address of the user; and wherein determining that the user incorrectly entered the sensitive data in the electronic form field includes determining that the user accidentally and incorrectly entered the sensitive data in the electronic form field.

16. The method of claim 11, wherein the operations further comprise:

detecting an electronic form field with inappropriate sensitive data; and requesting the user remove the sensitive data from the electronic form field.

17. The method of claim 16, wherein the operations further comprise preventing the user from advancing to a next screen until the sensitive data is removed.

18. A computer-implemented method, comprising:

detecting interaction with an electronic form by a user;

receiving non-biometric behavioral data of the user comprising user profile data and digital engagement data representing how the user interacts with a customer agent;

executing a machine learning model based on the non-biometric behavioral data of the user comprising the user profile data and the digital engagement data representing how the user interacts with the customer agent as input, wherein the machine learning model has been trained to (i) predict a likelihood that the user will enter sensitive data in an electronic form field inappropriately, such that the sensitive data will be unmasked, by comparing similarities of the non-biometric behavioral data of the user to non-biometric behavioral data of other users, including pasted interactions of the other users with the electronic form, and (ii) output the sensitive data after determining that the user incorrectly entered the sensitive data in the electronic form field; and initiating user assistance by receiving questions from the user via an interactive display and responding to the user with information that mitigates risk of inappropriate entry of sensitive data in the electronic form field when the likelihood satisfies a predetermined threshold.

19. The method of claim 18, further comprising triggering display of a tooltip associated with the electronic form field as the user assistance to indicate a likelihood that the sensitive data will be inappropriately included in the field.

20. The method of claim 19, further comprising:

detecting sensitive data in the electronic form field;

requesting the user redact the sensitive data; and preventing input in other electronic form fields until the sensitive data is redacted.

* * * * *